(12) United States Patent
Hartmann et al.

(10) Patent No.: US 11,865,966 B1
(45) Date of Patent: Jan. 9, 2024

(54) ILLUMINATION APPARATUS FOR A MOTOR VEHICLE HEADLAMP

(71) Applicant: ZKW Group GmbH, Wieselburg (AT)

(72) Inventors: Peter Hartmann, Schonbuhel (AT); Matthaus Artmann, Ybbs an der Donau (AT); Martin Brandstetter, Ybbs an der Donau (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/031,699

(22) PCT Filed: Sep. 22, 2021

(86) PCT No.: PCT/EP2021/076029
§ 371 (c)(1),
(2) Date: Apr. 13, 2023

(87) PCT Pub. No.: WO2022/083959
PCT Pub. Date: Apr. 28, 2022

(30) Foreign Application Priority Data

Oct. 19, 2020 (EP) .................... 20202590

(51) Int. Cl.
| | | |
|---|---|---|
| *B60Q 1/14* | (2006.01) | |
| *B60Q 1/00* | (2006.01) | |
| *G01S 7/481* | (2006.01) | |
| *G01S 17/88* | (2006.01) | |
| *F21Y 115/10* | (2016.01) | |
| *F21S 41/153* | (2018.01) | |

(52) U.S. Cl.
CPC ........... *B60Q 1/143* (2013.01); *B60Q 1/0023* (2013.01); *G01S 7/4816* (2013.01); *G01S 7/4817* (2013.01); *G01S 17/88* (2013.01); *B60Q 2300/056* (2013.01); *F21S 41/153* (2018.01); *F21Y 2115/10* (2016.08)

(58) Field of Classification Search
CPC .................. B60Q 1/0023; B60Q 1/143; B60Q 2300/056; F21S 41/153; F21Y 2115/10; G01S 7/4816–4817; G01S 17/88
See application file for complete search history.

(56) References Cited

U.S. PATENT DOCUMENTS

| | | |
|---|---|---|
| 2005/0180149 A1 | 8/2005 | Albou et al. |
| 2011/0267455 A1 | 3/2011 | Götz et al. |
| 2014/0085468 A1 | 3/2014 | Faber et al. |
| 2020/0055440 A1 | 2/2020 | Mano |

FOREIGN PATENT DOCUMENTS

| | | |
|---|---|---|
| EP | 2380774 A1 | 10/2011 |
| WO | 0204247 A1 | 1/2002 |

OTHER PUBLICATIONS

European Search Report for European Patent Application No. 20202590.4, dated Apr. 13, 2021 (6 Pages).
International Search Report and Written Opinion for PCT/EP2021/076029, dated Jan. 7, 2022 (13 Pages).

*Primary Examiner* — Jason M Han
(74) *Attorney, Agent, or Firm* — Eversheds Sutherland (US) LLP

(57) ABSTRACT

Illumination device (10) for a motor vehicle headlight for detection and targeted masking of a light-emitting object (20) present in front of the illumination device (10) in segmented light distribution, which illumination device (10) comprises the following:
a light generation unit (100), having a plurality of light pixel groups (110a, 110b ,110c, 110d)
a light sensor device (200) for detecting light of a light-emitting object (20) with a first light sensor (210) having several first sensor pixels (211),
a control unit (300), which is connected to the light generation unit (100) and the light sensor device (200) and is designed to control the light generation unit (100) for generating the segmented light distribution,
wherein one sensor pixel (211) can detect light in a detection solid angle (DRa, DRb, DRc, DRd) and is respectively associated with a light pixel group (110a, 110b, 110c, 110d), and wherein the light incident on each first sensor pixel (211) can be detected as a luminous flux value associated with the respective first sensor pixel (211),
wherein the light sensor device (200) additionally has a second light sensor (220) for measuring distance, and wherein the control unit (300) is designed to individually compare the luminous flux values detected by the respective first sensor pixels (211) with a respectively definable threshold and, if the threshold is exceeded, to reduce the luminous flux of the corresponding light pixel groups (110a, 110b, 110c, 110d),
wherein in the event that it is determined that the threshold has been exceeded in two detection solid angles (DRa, DRc) and it is determined that the threshold has not been exceeded in a detection solid angle (DRb) between these two detection solid angles (DRa, DRc), the control unit (300) is designed to derive a presumed object width and compare it to an actual object width, which actual object width can be determined by means of the second light sensor (220),
wherein, if the presumed object width matches the actual object width, the control device (300) is designed to reduce the luminous flux of the corresponding light pixel groups (110a, 110b, 110c).
FIG. 4

17 Claims, No Drawings

ILLUMINATION APPARATUS FOR A MOTOR VEHICLE HEADLAMP

The invention relates to an illumination device for a motor vehicle headlight for detection and targeted masking of a light-emitting object present in front of the illumination device in segmented light distribution, which illumination device comprises the following:

- a light generation unit, which comprises several light pixels, which are arranged in an array of light pixels in rows and columns, wherein the light generation unit is designed to emit segmented light distribution in a main emission direction in front of the illumination device,
- a light sensor device for detecting light of a light-emitting object with a first light sensor, which first light sensor has several first sensor pixels, which are arranged in a row, wherein the first sensor pixels are designed to detect luminous flux from light incident on the first light sensor in a wavelength range of 380 nm to 780 nm,
- a control unit, which is connected to the light generation unit and the light sensor device and is designed to control the light generation unit for generating the segmented light distribution.

Furthermore, the invention relates to a motor vehicle headlight having at least one illumination device according to the invention.

ADB systems or ADB motor vehicle headlights usually comprise an ambient recording device, such as a camera or camera system, and a motor vehicle headlight system. The (well-known) functionality of an ADB system consists in the motor vehicle headlight system, depending on information that the ambient recording device provides to the motor vehicle headlight system, controlling the motor vehicle headlights and, for example, masking or dimming corresponding areas of the light distribution generated by means of the motor vehicle headlights.

In matrix-type ADB systems, a masking area is usually created by switching off/dimming the corresponding light source. The aforementioned illumination device for a motor vehicle headlight is preferably a matrix-type device.

In particular from the point of view of the motor vehicle headlight manufacturer, the disadvantage of ADB systems is that the ambient recording device is structurally separate from the motor vehicle headlight system. The aforementioned essential parts of an ADB system usually come from different manufacturers. A motor vehicle headlight system typically has an interface, which is provided to supply information made available by the ambient recording device. This means, for example, that when a motor vehicle headlight manufacturer is configuring dipped beam scenarios, they are reliant on information supplied by an externally provided, for example purchased, ambient recording device. The specified information is often available in the form of so-called object lists. The ambient recording device produces such object lists by taking pictures with the aforementioned camera system in the field of view of the camera system, for example, wherein the field of view is preferably adjusted to the relevant area in front of the motor vehicle, and these pictures are evaluated with the help of a processing unit present in the ambient recording device. Adjusting the field of view to the relevant area is understood to mean that the field of view has an opening angle that is large enough to detect at least the roadway located in front of the motor vehicle. The processing unit supplies the abovementioned object lists as output. Vehicles such as lorries, cars, motorbikes, etc. can be objects in such lists, for example. Each individual object is typically assigned coordinates in the camera system's coordinate system. This origin coordinate system thus often has its origin approximately at the rear side of the rearview mirror in the interior of the motor vehicle as a camera of the camera system is usually located there.

Now when the control system receives such an object list as input, it calculates a light image to be produced according to the object list. To do this, the coordinates of the objects must first be converted into a coordinate system of the motor vehicle headlights. This requires a relatively high level of computing power, causes a relevant time delay and is a possible source of errors. Moreover, there are often additional errors that arise due to incorrect detection of the objects by the processing unit of the ambient recording device. A frequent error of this type is confusion between a lorry in front and two motorbikes—the processing unit detects rear lights of a lorry on the basis of a first image, wherein the same rear lights are interpreted as two motorbikes in a second, for example, subsequent image. Since the control system of the motor vehicle headlight system cannot influence this data, an area between the rear lights can periodically be lit up and dimmed out, depending on whether the rear lights are assigned to the two motorbikes (light up) or the lorry (mask) in the object list. This may dazzle the driver due to light reflection.

Furthermore, it is possible that, for example, an oncoming multi-track motor vehicle with usually two spaced apart motor vehicle headlights is merely perceived as two independent light sources by the sensor unit, wherein two sensor pixels of the light sensor are respectively "activated" due to a definable luminous flux threshold being exceeded, wherein one sensor pixel that has not been activated is between these two activated sensor pixels. The control unit would merely be prompted to reduce the luminous flux of the light pixel groups associated with the two "activated" sensor pixels, dazzling a driver of the oncoming vehicle.

It is an object of the invention to provide an improved illumination device.

This object is achieved by virtue of the fact that the light generation unit, the light sensor device and the control unit are arranged together on a base support, and together with the base support form an assembly, wherein the light pixels of the array of light pixels are divided into a plurality of light pixel groups, wherein one light pixel group can respectively produce a segment of the segmented light distribution in a light solid angle, wherein each light pixel group comprises at least one light pixel, and wherein one sensor pixel of the plurality of first sensor pixels can respectively detect light in a detection solid angle associated with the respective sensor pixel and is respectively associated with a light pixel group, wherein a different detection solid angle is associated with each sensor pixel of the plurality of first sensor pixels, wherein the detection solid angles are substantially adjacent to one another and form an overall detection solid angle, in which light from the light-emitting object can be detected, and wherein the light incident on each first sensor pixel can be detected as a luminous flux value associated with the respective first sensor pixel, wherein the detection solid angle that can be detected by a first sensor pixel is substantially identical to the light solid angle of the respectively associated light pixel group, wherein the illumination device has a laser beam generating device for measuring the distance of an object present in front of the illumination device, which laser beam generating device is designed to emit at least one laser beam in a wavelength range of 780 nm to 1 mm in front of the illumination device and to change it in a horizontal orientation, wherein the light sensor device additionally comprises a second light sensor, which second light sensor comprises a plurality of second sensor pixels, which are arranged in a row, wherein the second sensor pixels are designed to detect luminous flux in the wavelength range of the laser beam of the laser beam generating unit from light incident on the second light sensor, and wherein the control unit is designed to individually compare the luminous flux values detected by the respective first sensor pixels with a respectively definable threshold and, if the threshold is exceeded, to reduce the luminous flux of the corresponding light pixel groups, wherein in the event that it is determined that the threshold has been exceeded in two first detection solid angles and it is determined that the threshold has not been exceeded in at least one detection solid angle between these two detection solid angles, the control unit is designed to derive a presumed object width, which corresponds to the number of first sensor pixels made up of the two detection solid angles, at which the threshold has been exceeded, and the detection solid angles lying between these two detection solid angles, and to compare it to an actual object width, which actual object width can be determined by means of a travel time measurement of the laser beam reflecting on the object by the second light sensor, wherein, if the presumed object width matches the actual object width, the control device is designed to reduce the luminous flux of the corresponding light pixel groups associated with the first sensor pixels of the presumed object width, despite failed exceeding of the threshold in the detection solid angles between the detection solid angles at which the threshold has been exceeded, and/or in the event that it is determined that the threshold has been exceeded in a detection solid angle, the control unit is designed to derive a presumed object width, which corresponds to the first sensor pixel, at which the threshold has been exceeded, and compare it with an actual object width, which actual object width can be determined by means of a travel time measurement and/or triangulation measurement of the laser beam reflecting on the object by the second light sensor, wherein the actual object width corresponds to the number of second sensor pixels, at which light of the laser beam reflecting on the object is detected, wherein if the actual object width is larger than the presumed object width, the control device is designed to reduce the luminous flux of those light pixel groups that correspond to the first sensor pixel, at which the threshold has been exceeded, and to those first sensor pixels, the detection solid angle of which is immediately adjacent to that detection solid angle at which it has been determined that the threshold has been exceeded, or the first sensor pixels that correspond to the second sensor pixels at which the actual object width has been determined.

With the triangulation measurement, the distance between the laser beam generating unit and the individual second sensor pixels of the second light sensor is known, wherein the angle at which the laser beam is emitted in its at least one row is also known and can be determined or retrieved by the control unit. Furthermore, the angle of the laser beam reflecting on the object can also be detected, for example by the corresponding second sensor pixel of the second light sensor and thereby known, whereby the distance of the area of the object, which area is hit and reflected by the laser beam, can be determined or calculated by the control unit.

It should be noted that the actual object width may correspond to the number of second sensor pixels at which light from the laser beam reflecting on the object is detected. The second sensor pixels correspond to the first sensor pixels, wherein the number of first and second sensor pixels is the same and exactly one second sensor pixel is associated with each first sensor pixel. Consequently, each second sensor pixel is associated with the corresponding light pixel group of the corresponding first sensor pixel.

As a result, an actual object width or object size of the object present in front of the illumination device can also be determined or derived as several points of the object are scanned by the laser beam that is changeable in the horizontal orientation, meaning that the object width or object size can be determined.

It can be provided that the distance of the object to the illumination device can be determined. A particularly simple structure results when the base support is designed as a single piece.

It can be provided that the base support has a heat sink, on which the light sensor, the illuminant and the control unit are arranged.

Moreover, it can advantageously be provided that the base support has a printed circuit board, wherein the light sensor, the illuminant and the control unit are mounted on the printed circuit board. It should be noted that in this case the light sensor, the illuminant and the control unit are also arranged on the base support but are not in contact therewith.

A particularly favourable variant involves several sensor pixels being grouped in the form of an "Active Pixel Sensor" (APS-CMOS) manufactured with CMOS technology, wherein here some peripheral circuits for the function of the photodiode (A/D conversion, clocking of the readout, amplification) are implemented directly on the same semiconductor component.

In one particularly favourable variant, it can be provided that one, on particular every light pixel is formed as at least one LED light source.

Moreover, it is conceivable that the control unit comprises at least two, preferably exactly two micro-controllers, which are connected to one another for communication, wherein one first micro-controller is preferably designed to control the light sensor and one second micro-controller is preferably designed to control the illuminant.

It can be advantageous if at least one of these micro-controllers is directly connected to the photoactive sensor element, e.g. placed directly behind it in the same electronic component housing ("chip package"), and executes sensor-related data processing. This pre-processing comprises, for example, comparing measurement values between pixels and with stored values and selecting and controlling stored evaluation characteristics (readout rate, exposure times, amplification).

It can be provided that one sensor pixel of the plurality of second sensor pixels can respectively detect light in a recognition solid angle associated with the respective sensor pixel and is respectively associated with a sensor pixel of the plurality of first sensor pixels, wherein the recognition solid angle of this second sensor pixel is substantially identical to the corresponding detection solid angle of the first sensor pixel.

It can be provided that the laser beam of the laser beam generating device can be emitted scanning in front of the illumination device in at least one horizontal line.

Laser scanning refers to the line or grid-like sweeping of surfaces or bodies with a laser beam in order to measure or process them or to generate an image.

It can be provided that the laser beam can be emitted in at least two, preferably four, lines, wherein the laser beam can be emitted scanning in only one of the at least two lines at a time.

It can also be provided that several laser beam generating units are included, which alternately scan or emit lines at different vertical distances.

It can be provided that the number of first sensor pixels is the same as the number of second sensor pixels.

It can be provided that the control unit is designed to determine the distance of the light-emitting object present in front of the illumination device from the illumination device by means of a travel time measurement with the help of the second light sensor.

It can be provided that the segmented light distribution is segmented full beam distribution.

It can be provided that the illumination device comprises an expansion optical system for expanding the laser beam of the laser beam generating unit.

It can be provided that the expansion optical system is a cylindrical lens designed to expand the laser beam of the laser beam generating device in the vertical direction.

This is intended to cover a larger area in the vertical direction.

It can be provided that, in the installed position of the illumination device, the first sensor pixels and the second sensor pixels are arranged one above the other in one row each on a common printed circuit board and particularly preferably that the first sensor pixels and the second sensor pixels are arranged on the same sensor chip, which is produced, for example, with CMOS technology, and wherein the illumination device comprises a sensor lens, which is associated with the first and second sensor pixels.

It can be provided that the lens is a cylindrical lens.

The common sensor lens is asymmetrical and designed, for example, as a cylindrical lens to ensure local resolution in the horizontal direction, but not in the vertical area. One sensor pixel looks at the entire vertical area in a certain horizontal direction.

This ensures good resolution in the horizontal direction, but no resolution in the vertical direction. The cylindrical lens enables a certain vertical area to be covered; the resolution in the vertical direction for the distance measurement is achieved by the at least one laser beam of the laser beam generating device, which can also be emitted alternately in vertically stacked lines.

It should be noted that in the presence of several lines or the line areas that are alternately scanned by a laser beam are adjacent to each other and do not overlap.

It can be provided that the first sensor pixels have a first filter, which is designed to transmit light exclusively in the wavelength range of 380 nm to 780 nm, wherein the second sensor pixels have a second filter, which is designed to transmit light exclusively in the wavelength range from 780 nm to 12 µm.

It can be provided that the at least one laser beam of the laser beam generating device is modulated.

The object is also achieved by a motor vehicle headlight having at least one illumination device according to the invention.

The invention is explained below in more detail based on exemplary drawings. In the drawings, FIG. 1 shows an exemplary illumination device with a light generation unit with several light pixel groups, a light sensor device with a first and second light sensor, a laser beam generating device and a control unit that can control the light generation unit and the light sensor device, FIG. 2 shows an exemplary illustration of a laser beam that can be produced by the laser beam generating device, which laser beam can be changed in several lines in its horizontal orientation, FIG. 3 shows an exemplary driving situation with an oncoming vehicle, FIG. 4 shows control of the sensor pixels of the first and second light sensor corresponding to the driving situation in FIG. 3, and corresponding control of the light pixel groups.

FIG. 1 shows an exemplary illumination device 10 for a motor vehicle headlight for detection and targeted masking of a light-emitting object 20 present in front of the illumination device 10 in segmented light distribution, for example full beam distribution, which illumination device 10 comprises a light generation unit 100, which comprises several light pixels 110, which are arranged in an array of light pixels in rows and columns, wherein the light generation unit 100 is designed to emit segmented light distribution in a main emission direction in front of the illumination device 10.

The illumination device 10 further comprises a light sensor device 200 for detecting light of a light-emitting object 20 with a first light sensor 210, which first light sensor 210 has several first sensor pixels 211, which are arranged in a row, wherein the first sensor pixels 211 are designed to detect luminous flux from light incident on the first light sensor 210 in a wavelength range of 380 nm to 780 nm, i.e. visible light.

The illumination device 10 further comprises a control unit 300, which is connected to the light generation unit 100 and the light sensor device 200 and is designed to control the light generation unit 100 for generating the segmented light distribution, and wherein the light generation unit 100, the light sensor device 200 and the control unit 300 are arranged together on a base support 50, and together with the base support 50 form an assembly.

The light pixels 110 of the array of light pixels are divided into a plurality of light pixel groups 110a, 110b, 110c, 110d, wherein each light pixel group comprises at least one light pixel 110, and wherein one light pixel group 110a, 110b, 110c, 110d can respectively produce a segment of the segmented light distribution in a light solid angle LRa, LRb, LRc, LRd, as shown schematically in FIG. 3, for example.

One sensor pixel of the plurality of first sensor pixels 211 of the first light sensor 210 can respectively detect light in a detection solid angle DRa, DRb, DRc, DRd associated with the respective sensor pixel 211, as can also be seen in FIG. 3, and is respectively associated with a light pixel group 110a, 110b, 110c, 110d, wherein a different detection solid angle is associated with each sensor pixel of the plurality of first sensor pixels 211.

The detection solid angles DRa, DRb, DRc, DRd are substantially adjacent to one another and form an overall detection solid angle, in which light from the light-emitting object 20 can be detected, wherein the light incident on each first sensor pixel 211 can be detected as a luminous flux value associated with the respective first sensor pixel 211.

The detection solid angle DRa, DRb, DRc, DRd that can be detected by a first sensor pixel 211 is substantially identical to the light solid angle LRa, LRb, LRc, LRd of the respectively associated light pixel group 110a, 110b, 100c, 110d.

In order to measure the distance or size of the object 20 present in front of the illumination device 10, the illumination device 10 comprises a laser beam generating device, which is designed to emit at least one laser beam 410 in a wavelength range of 780 nm to 1 mm in front of the illumination device 10 and to change it in a horizontal orientation.

The laser beam 410 of the laser beam generating device 400 can be emitted scanning in front of the illumination device 10 in at least one horizontal line; four lines are illustrated in the example shown in FIG. 2.

The light sensor device 200 additionally comprises a second light sensor 220, which comprises a plurality of second sensor pixels 221, which are arranged in a row, wherein the second sensor pixels 221 are designed to detect luminous flux in the wavelength range of the laser beam 410 of the laser beam generating unit 400 from light incident on the second light sensor 220. One sensor pixel of the plurality of second sensor pixels 221 can respectively detect light in a recognition solid angle ERa, ERb, ERc, ERd associated with the respective sensor pixel 221 and is respectively associated with a sensor pixel of the plurality of first sensor pixels 211, wherein the recognition solid angle of this second sensor pixel 221 is substantially identical to the corresponding detection solid angle DRa, DRb, DRc, DRd of the first sensor pixel 211. The number of first sensor pixels 211 corresponds to the number of second sensor pixels 221.

The control unit 300 is further designed to individually compare the luminous flux values detected by the respective first sensor pixels 211 with a respectively definable threshold and, if the threshold is exceeded, to reduce the luminous flux of the corresponding light pixel groups 110a, 110b, 110c, 110d.

In the event that it is determined that the threshold has been exceeded in two detection solid angles DRb, DRd and it is determined that the threshold has not been exceeded in at least one detection solid angle DRc between these two detection solid angles DRb, DRd, as illustrated in the example shown in FIGS. 3 and 4, the control unit 300 is designed to derive a presumed object width of the oncoming vehicle 20, which corresponds to the number of first sensor pixels 211 made up of the two detection solid angles DRb, DRd, at which the threshold has been exceeded, and the detection solid angles DRc lying between these two detection solid angles, and to compare it to an actual object width, which actual object width can be determined by means of a travel time measurement and/or triangulation measurement of the laser beam 410 reflecting on the object 20 by the second light sensor 220.

If the presumed object width now matches the actual object width, the control device 300 is designed to reduce the luminous flux of the corresponding light pixel groups 110b, 110c, 110d associated with the first sensor pixels 211 of the presumed object width, despite failed exceeding of the threshold in the detection solid angle DRc between the detection solid angles DRb, DRd at which the threshold has been exceeded.

In addition, the control unit 300 is designed to determine the distance of the light-emitting object 20 present in front of the illumination device 10 from the illumination device 10 by means of a travel time measurement and/or triangulation measurement with the help of the second light sensor 220.

Furthermore, the illumination device 10 comprises an expansion optical system for expanding the laser beam 410 of the laser beam generating unit 400, wherein the expansion optical system is a cylindrical lens designed to expand the laser beam 410 of the laser beam generating device 400 in the vertical direction.

With the triangulation measurement, the distance between the laser beam generating unit 400 and the individual second sensor pixels 221 of the second light sensor 220 is known, wherein the angle at which the laser beam is emitted in its at least one row is also known and can be determined or retrieved by the control unit 300. Furthermore, the angle of the laser beam reflecting on the object can also be detected, for example by the corresponding second sensor pixel 221 of the second light sensor 220 and thereby known, whereby the distance of the area of the object, which area is hit and reflected by the laser beam, can be determined or calculated by the control unit.

Furthermore, it can be provided that in the event that it is determined that the threshold has been exceeded in a detection solid angle DRa, DRb, DRc, the control unit is designed to derive a presumed object width, which corresponds to the first sensor pixel 211, at which the threshold has been exceeded, and compare it with an actual object width, which actual object width can be determined by means of a travel time measurement and/or triangulation measurement of the laser beam 410 reflecting on the object 20 by the second light sensor 220, wherein the actual object width corresponds to the number of second sensor pixels, at which light of the laser beam reflecting on the object is detected, wherein if the actual object width is larger than the presumed object width, the control device is designed to reduce the luminous flux of those light pixel groups 110a, 110b, 110c that correspond to the first sensor pixel, at which the threshold has been exceeded, and to those first sensor pixels 211, the detection solid angle of which is immediately adjacent to that detection solid angle at which it has been determined that the threshold has been exceeded, or the first sensor pixels that correspond to the second sensor pixels at which the actual object width has been determined.

Reference List

Illumination device . . . 10
Object, vehicle . . . 20
Base support . . . 50
Light generation unit . . . 100
Light pixel . . . 110
Light pixel groups . . . 110a, 110b, 110c, 110d
Light sensor device . . . 200
First light sensor . . . 210
First sensor pixel . . . 211
Second light sensor . . . 220
Second sensor pixel . . . 221
Control unit . . . 300
Laser generating unit . . . 400
Laser beam . . . 410
Light solid angle . . . LRa, LRb, LRc, LRd
Detection solid angle . . . DRa, DRb, DRc, DRd
Recognition solid angle . . . ERa, ERb, ERc, ERd

The invention claimed is:

1. An illumination device (10) for a motor vehicle headlight for detection and targeted masking of a light-emitting object (20) present in front of the illumination device (10) in segmented light distribution, the illumination device (10) comprising:

a light generation unit (100), which comprises several light pixels (110), which are arranged in an array of light pixels in one or more rows and columns, wherein the light generation unit (100) is designed to emit segmented light distribution in a main emission direction in front of the illumination device (10);

a light sensor device (200) for detecting light of a light-emitting object (20) with a first light sensor (210), which first light sensor (210) has several first sensor pixels (211), which are arranged in a row, wherein the first sensor pixels (211) are designed to detect luminous flux from light incident on the first light sensor (210) in a wavelength range of 380 nm to 780 nm;

a control unit (300), which is connected to the light generation unit (100) and the light sensor device (200) and is designed to control the light generation unit (100) for generating the segmented light distribution, wherein the light generation unit (100), the light sensor device (200) and the control unit (300) are arranged together on a base support (50), and together with the base support (50) form an assembly, wherein the light pixels (110) of the array of light pixels are divided into a plurality of light pixel groups (110*a*, 110*b*, 110*c*, 110*d*), wherein one light pixel group (110*a*, 110*b*, 110*c*, 110*d*) can respectively produce a segment of the segmented light distribution in a light solid angle (LRa, LRb, LRc, LRd), wherein each light pixel group comprises at least one light pixel (110), wherein one sensor pixel of the plurality of first sensor pixels (211) can respectively detect light in a detection solid angle (DRa, DRb, DRc, DRd) associated with the respective sensor pixel (211) and is respectively associated with a light pixel group (110*a*, 110*b*, 110*c*, 110*d*), wherein a different detection solid angle is associated with each sensor pixel of the plurality of first sensor pixels (211), wherein the detection solid angles (DRa, DRb, DRc, DRd) are substantially adjacent to one another and form an overall detection solid angle, in which light from the light-emitting object (20) can be detected, and wherein the light incident on each first sensor pixel (211) can be detected as a luminous flux value associated with the respective first sensor pixel (211), wherein the detection solid angle (DRa, DRb, DRc, DRd) that can be detected by a first sensor pixel (211) is substantially identical to the light solid angle (LRa, LRb, LRc, LRd) of the respectively associated light pixel group (110*a*, 110*b*, 100*c*, 110*d*), wherein the illumination device (10) has a laser beam generating device (400) for measuring the distance of the object (20) present in front of the illumination device (10), which laser beam generating device (400) is designed to emit at least one laser beam (410) in a wavelength range of 780 nm to 12 µm in front of the illumination device (10) and to change it in a horizontal orientation, wherein the light sensor device (200) additionally comprises a second light sensor (220), which second light sensor (220) comprises a plurality of second sensor pixels (221), which are arranged in a row, wherein the second sensor pixels (221) are designed to detect luminous flux in the wavelength range of the laser beam (410) of the laser beam generating unit (400) from light incident on the second light sensor (220), wherein the control unit (300) is designed to individually compare the luminous flux values detected by the respective first sensor pixels (211) with a respectively definable threshold and, if the threshold is exceeded, to reduce the luminous flux of the corresponding light pixel groups (110*a*, 110*b*, 110*c*, 110*d*), wherein in the event that it is determined that the threshold has been exceeded in two detection solid angles (DRa, DRc) and it is determined that the threshold has not been exceeded in at least one detection solid angle (DRb) between these two detection solid angles (DRa, DRc), the control unit (300) is designed to derive a presumed object width, which corresponds to the number of first sensor pixels (211) made up of the two detection solid angles (DRa, DRc), at which the threshold has been exceeded, and the detection solid angles (DRc) lying between these two detection solid angles, and to compare it to an actual object width, which actual object width can be determined by means of a travel time measurement and/or triangulation measurement of the laser beam (410) reflecting on the object (20) by the second light sensor (220), and wherein, if the presumed object width matches the actual object width, the control device (300) is designed to reduce the luminous flux of the corresponding light pixel groups (110*a*, 110*b*, 110*c*) associated with the first sensor pixels (211) of the presumed object width, despite failed exceeding of the threshold in the detection solid angles (DRb) between the detection solid angles (DRa, DRc) at which the threshold has been exceeded.

2. The illumination device according to claim 1, wherein in the event that it is determined that the threshold has been exceeded in a detection solid angle (DRa, DRb, DRc), the control unit is designed to derive a presumed object width, which corresponds to the first sensor pixel (211), at which the threshold has been exceeded, and compare it with an actual object width, which actual object width can be determined by means of a travel time measurement and/or triangulation measurement of the laser beam (410) reflecting on the object (20) by the second light sensor (220), wherein the actual object width corresponds to the number of second sensor pixels, at which light of the laser beam reflecting on the object is detected, wherein if the actual object width is larger than the presumed object width, the control device is designed to reduce the luminous flux of those light pixel groups (110*a*, 110*b*, 110*c*) that correspond to the first sensor pixel, at which the threshold has been exceeded, and to those first sensor pixels (211), the detection solid angle of which is immediately adjacent to that detection solid angle at which it has been determined that the threshold has been exceeded, or the first sensor pixels that correspond to the second sensor pixels at which the actual object width has been determined.

3. The illumination device according to claim 1, wherein one sensor pixel of the plurality of second sensor pixels (221) can respectively detect light in a recognition solid angle (ERa, ERb, ERc, ERd) associated with the respective sensor pixel (221) and is respectively associated with a sensor pixel of the plurality of first sensor pixels (211), wherein the recognition solid angle of this second sensor pixel (221) is substantially identical to the corresponding detection solid angle (DRa, DRb, DRc, DRd) of the first sensor pixel (211).

4. The illumination device according to claim 1, wherein the at least one laser beam (410) of the laser beam generating device (400) can be emitted scanning in front of the illumination device (10) in at least one horizontal line.

5. The illumination device according to claim 4, wherein the laser beam (410) can be emitted alternately in at least two lines, wherein the laser beam (410) can be emitted scanning in only one of the at least two lines at a time.

6. The illumination device according to claim 5, wherein the laser beam (410) can be emitted alternately in four lines, wherein the laser beam (410) can be emitted scanning in only one of the four lines at a time.

7. The illumination device according to claim 1, wherein the number of first sensor pixels (211) is the same as the number of second sensor pixels (221).

8. The illumination device according to claim 1, wherein the control unit (300) is designed to determine the distance of the light-emitting object (20) present in front of the illumination device (10) from the illumination device (10) by means of a travel time measurement and/or triangulation measurement with the help of the second light sensor (220).

9. The illumination device according to claim 1, wherein the segmented light distribution is segmented full beam distribution.

10. The illumination device according to claim 1, wherein the illumination device (10) comprises an expansion optical system for expanding the laser beam (410) of the laser beam generating unit (400).

11. The illumination device according to claim 10, wherein the expansion optical system is a cylindrical lens designed to expand the laser beam (410) of the laser beam generating device (400) in the vertical direction.

12. The illumination device according to claim 1, wherein, in the installed position of the illumination device, the first sensor pixels (211) and the second sensor pixels (221) are arranged one above the other in one row each on a common printed circuit board.

13. The illumination device according to claim 12, wherein the first sensor pixels and the second sensor pixels are arranged on the same sensor chip, and wherein the illumination device comprises a sensor lens, which is associated with the first and second sensor pixels (211, 221).

14. The illumination device according to claim 1, wherein the sensor lens is a cylindrical lens.

15. The illumination device according to claim 1, wherein the first sensor pixels (211) have a first filter, which is designed to transmit light exclusively in the wavelength range of 380 nm to 780 nm, wherein the second sensor pixels (221) have a second filter, which is designed to transmit light exclusively in the wavelength range from 780 nm to 12 µm.

16. The illumination device according to claim 1, wherein the at least one laser beam of the laser beam generating device (400) is modulated.

17. A motor vehicle headlight comprising at least one illumination device in accordance with claim 1.

\* \* \* \* \*